United States Patent

[11] 3,617,018

| [72] | Inventor | Russell E. Baetke Seattle, Wash. |
|---|---|---|
| [21] | Appl. No. | 5,685 |
| [22] | Filed | Jan. 26, 1970 |
| [45] | Patented | Nov. 2, 1971 |
| [73] | Assignee | The Boeing Company Seattle, Wash. |

[54] FOLDING FLAP
4 Claims, 3 Drawing Figs.

[52] U.S. Cl........................................ 244/42 D, 244/42 CA
[51] Int. Cl........................................ B64c 3/50, B64c 9/26
[50] Field of Search........................................ 244/42 R, 42 CA, 42 CB, 42 D, 42 DA, 42 DB, 43, 44

[56] References Cited
UNITED STATES PATENTS

| 3,126,173 | 3/1964 | Alvarez-Calderon ........ | 244/42 DB |
| 2,152,033 | 3/1939 | Dornier........................ | 244/42 DA |
| 3,363,859 | 1/1968 | Watts........................... | 244/42 CA |
| 3,128,966 | 4/1964 | Alvarez-Calderon ........ | 244/42 CB X |
| 3,504,870 | 4/1970 | Cole et al..................... | 244/42 R |
| 2,127,864 | 8/1938 | Girard.......................... | 244/42 D X |
| 3,203,647 | 8/1965 | Alvarez-Calderon ........ | 244/42 R |

Primary Examiner—Milton Buchler
Assistant Examiner—Jeffrey L. Forman
Attorneys—Glenn Orlob and Nicolaas De Vogel ABSTRACT: A flap connected to a wing by a geared hinge. Extension or retraction of the flap is accomplished by an actuating and drive mechanism arranged on the flap. Upon command of an associated remotely positioned control means the actuating mechanism will via the drive mechanism drive the geared hinge connection for moving the flap into a predetermined position in reference to the wing surface.

3,617,018

INVENTOR:
RUSSELL E. BAETKE
BY
AGENT

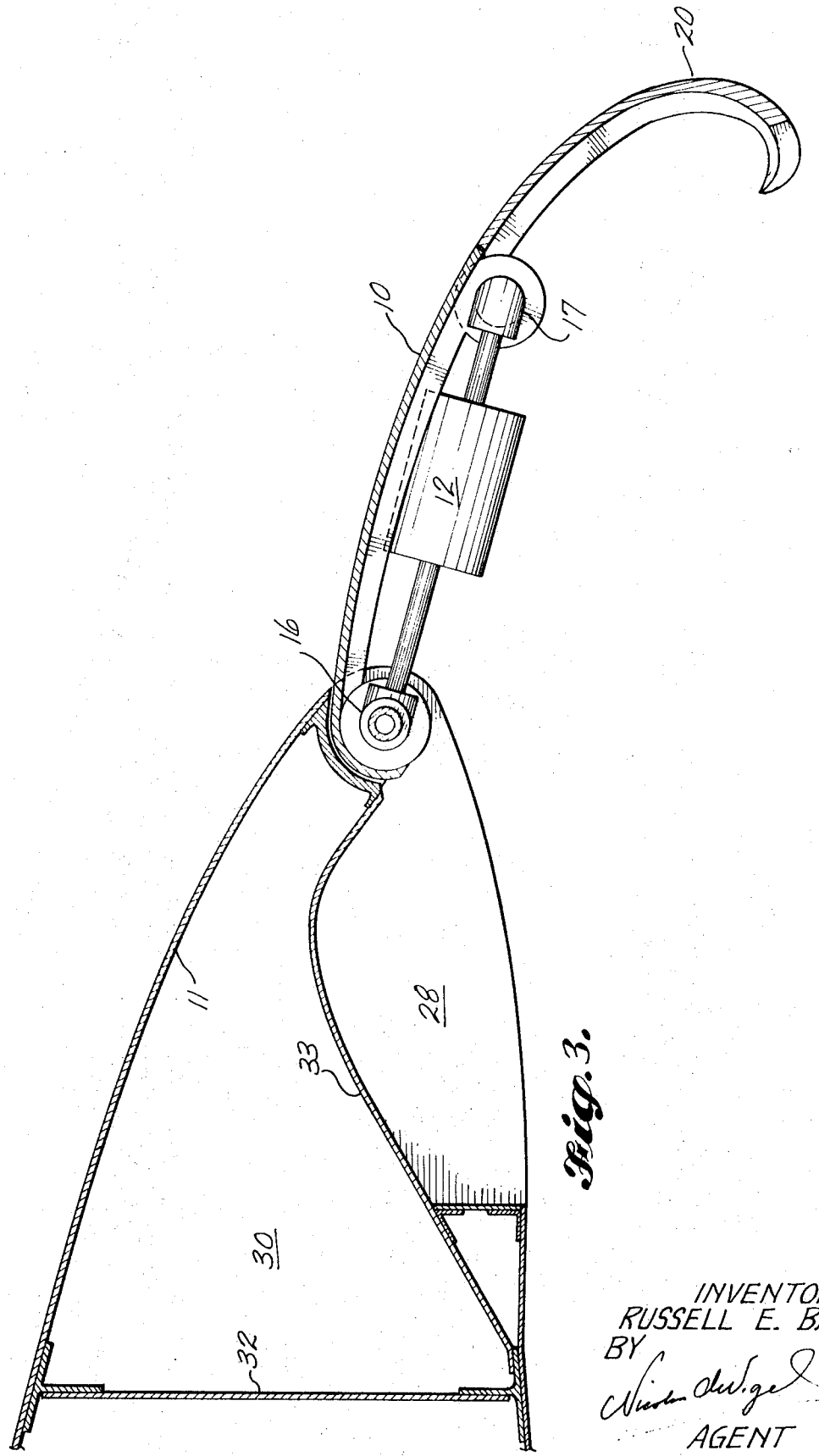

3,617,018

FOLDING FLAP

BACKGROUND OF THE INVENTION

1. Field of the Invention

The present invention is an arrangement for varying the area of a lifting surface driven through a fluid by displacing a flap which is operably linked to the lifting surface. The displacement, being either extension or retraction of the flap to a predetermined position thereof in reference to the lifting surface, is initiated by an associated control, which operates an actuating system. The actuating system includes a power means with drive means which is disposed on the flap. The drive means is connected to the operable linkage between the flap and the lifting surface for driving the operable connection.

2. Prior Art

There are various types of mechanisms and constructions in the prior art for extending, unfolding and/or retracting wing flaps. Almost every known technique used on present aircraft for moving flaps, slats, ailerons, etc., is accomplished by push rods, bellcranks, overcenter locking linkages, tracks and rollers, etc. which are positioned in the wing interior. Besides the fact of weight and space utilized by this arrangement, there are also openings provided in the wing or the flap for the connection of the actuating mechanism via push rods or sliding tracks.

The present invention does not employ an actuating mechanism located within the wing interior and does not need openings or exterior linkages for the extension or retraction of the flap via a sliding or pivoting arrangement. Accordingly, the prior art appears to be unaware of the hereinafter disclosed novel technique and design for operating wing flaps.

SUMMARY OF THE INVENTION

The folding and mechanization employed in the present invention is accomplished by a power force within the flap itself. Since there are many devices for changing the area surface of a wing, it is felt appropriate to explain the invention for one particular application which offers most of the advantages. The preferred embodiment chosen is a highly cambered Kreuger-type flap developed especially for the Boeing 707 wing leading edge and is illustrated in a configuration applicable to that wing. Because the actuating and drive mechanism is on the flap itself, an unrestricted useful interior area becomes available in the wing, except for the recess where the flap is stowed in folded position, so that this now useful area can be utilized for other equipment, such as safety devices, gas storage, etc.

Another feature is the clean surfaces on the flap and wing. In other words, dirt particles cannot enter the wing interior and there are no outside linkages which can be fouled up, especially when reverse engine thrust is applied. As a result, the closing speed or retraction time of the present leading edge flap is not an important problem as compared to conventional leading edge flaps. Conventional leading edge flaps have to be retracted within 6 seconds during touchdown because of the jet engine reverse thrust contamination problems. Consequently, a powerful hydraulic system is required for the conventional system, being not only costly but heavy.

The present invention allows for a sealed off interior and therefore a large hydraulic system for fast closing is not necessary. Thus, a weight and cost saving feature is achieved and thrust reverse contamination is harmless.

Since no rods or pivoted levers are used, but a direct actuation of the flap through the use of geared hinges, the flap can be rotated to very flat extension angles which are very difficult to obtain with linkage designs.

In addition, it should be noted that the particular leading edge flap design hereinafter explained allows for extension of a leading edge flap having a chord which is greater than the distance between the nose of the wing and the front spar of the wing.

DESCRIPTION OF THE ILLUSTRATIONS

FIG. 3 is a view taken from FIG. 2 along line 3—3. The extended flap is illustrated at a relative flap angle with reference to the wing chord.

DESCRIPTION OF THE PREFERRED EMBODIMENT

The required movement of the leading edge flap 10 is most likely commanded from the cockpit by a manually operated control device or by an automatic pilot means (not shown). This initiation will operate the actuating means 12 shown in FIGS. 1, 2 and 3.

Figure 2:
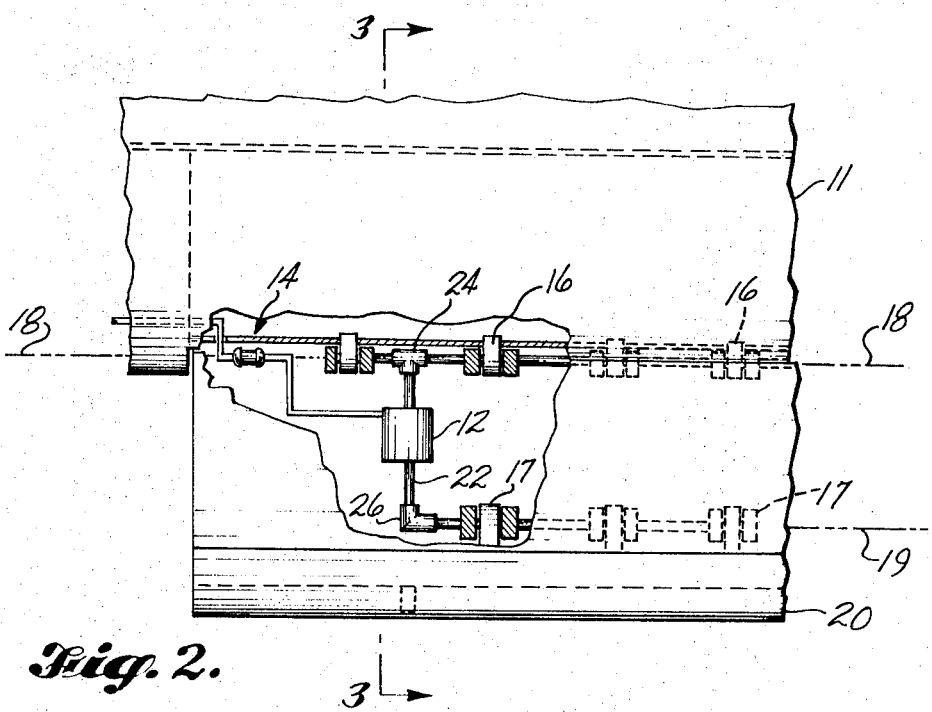
FIG. 2 is a plan view of the leading edge portion of the wing with the leading edge flap in its extended position. A cutout portion reveals the actuating and drive mechanisms mounted to the flap and the geared box hinges employed at various locations between the wing and flap sections.

Of course, it should be understood that the power for the actuating means 12 may be derived from an electric, hydraulic, pneumatic etc. source. However, since most aircraft rely on hydraulic means for flap operation, it can be easily conceived that a hydraulic feed-in is arranged by a flexible duct or cable between wing and flap or by entrance via a "hollow hinge coupling" shaft arrangement 14 as shown in FIG. 2.

If an electric motor is used instead of the hydraulic means 12, the arrangement of a remote control or a flexible electric feed-in cable arrangement 14 can be easily visualized.

Powered hinges or geared hinges 16 and 17 are schematically illustrated at the flap-wing hinge line 18 and flap 10 and flap extension 20 and hinge line 19 respectively. (See FIG. 2.) Upon command from the control means (not shown) the actuating means 12 will rotate the drive means 22 or shaft 22 or the like by direct connection with gear hinge 16 and 17 or via a "T" coupling 24 or "L" coupling 26 for driving the power or gear hinges 16 and 17.

Figure 1:
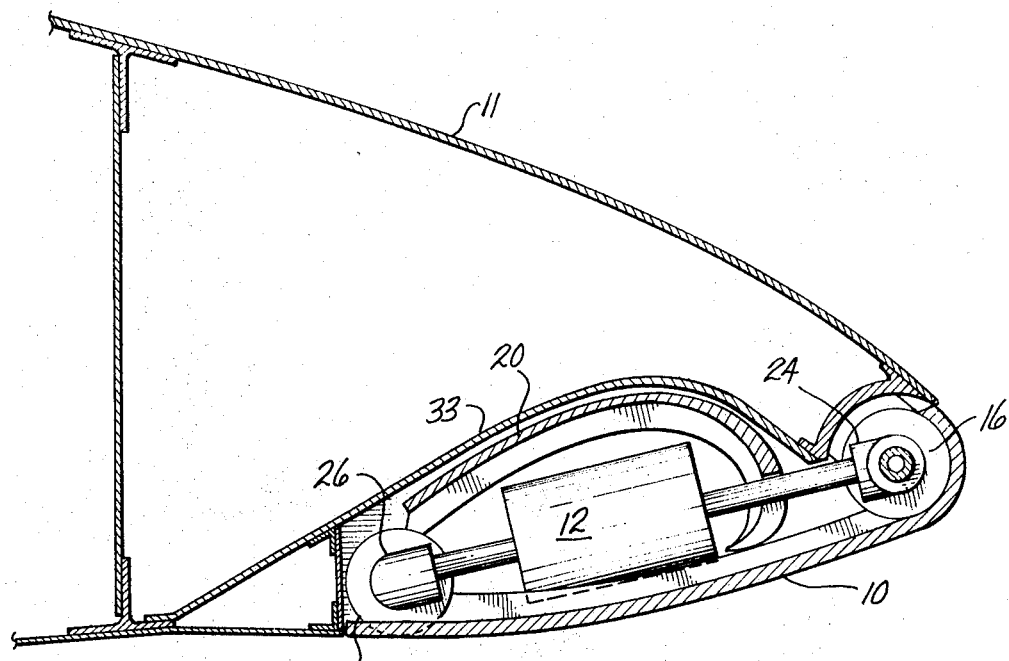
FIG. 1 is a vertical cross section of the leading edge portion of an airfoil or wing including the front spar and the folded-up or retracted leading edge flap.

Thus, upon command by the control means, the folded-up leading edge flap 10 and 20 shown in FIG. 1 will unfold and erect into a curved leading edge flap. Depending upon the gear ratio used in the gear hinge 17, a smooth curved surface is obtained by the flap 10 and flap extension 20 immediately away from the wing cavity or recess 28. Thereafter the positioning of the flap 10–20 to any desired angle in reference with the wing 11 chord will be accomplished.

As mentioned before the detrimental effect of airblast and contamination during reverse jet engine operation cannot enter into the wing interior 30 or act against the front spar 32, since the area is closed by a web 33. Since the couplings 24, 26 and gear hinges 16, and 17 and the actuating means 12 are conventionally sealed and enclosed units, the complete arrangement provides for high reliability and sturdiness.

Furthermore, large power units for fast closure of the flap 10–20 are not required in this particular case as for the reasons mentioned hereinbefore and a weight saving as well as economic savings can be visualized.

The general aspects and a specific embodiment relating to a leading edge configuration of the Kreuger flap type have been described in detail. However, the invention is obviously not limited to this type of flap described as the preferred embodiment. Instead, many modifications will occur to those skilled in the art which clearly lie within the scope of the invention. The invention is thus intended to cover such modifications and is to be limited in scope only by the appended claims.

Now, therefore, I claim:

1. A leading edge flap for an aircraft wing comprising in combination
   a. a wing having a lower surface provided with a recess at the leading edge area,
   b. a first geared hinge means mounted at the leading edge for pivotally connecting said leading edge flap,
   c. said leading edge flap having a first and second flap portion to form next to one another said leading edge, d. a connection between said first and second flap portion being a second geared hinge means,
e. an actuating mechanism including a drive means mounted to said first flap portion and coupled for rotational drive by said drive means to said first and second geared hinge means and
f. associated remotely positioned control means for initiating said actuating means so that said first and said second flap portions are pivoted about said first and second geared hinges for unfolding from said recess into an extended leading edge flap position forming an angle in reference to said wing surface and for folding said leading edge flap about said first and second geared hinges into said first and said second flap portion respectively for stowing into said wing recess.

2. A leading edge flap for an aircraft wing as claimed in claim 1 wherein said first and said second geared hinge to be driven by said drive means of said actuating mechanism have a gear ratio which will unfold said first and second flap portion to a smooth leading edge flap immediately out of said recess and wherein said flap is adapted by operation of said first hinge gear to be positioned at a predetermined required angle in reference to said wing surface upon further control by said associated control means.

3. A leading edge flap for aircraft wing as claimed in claim 2 wherein said actuating means comprises an hydraulic mechanism for powering said drive means, so that said drive means coupled to said first and second geared hinges provides for rotation of said hinges.

4. A leading edge flap for aircraft wing as claimed in claim 2 wherein said actuating means comprises an electric motor for driving said drive means so that rotation thereof causes said first and second geared hinges to rotate internally for movement of said leading edge flap.